United States Patent
Chen et al.

(10) Patent No.: US 7,436,829 B2
(45) Date of Patent: Oct. 14, 2008

(54) METHODS AND APPARATUS FOR RECONFIGURING PACKETS TO HAVE VARYING SIZES AND LATENCIES

(75) Inventors: Inching Chen, Portland, OR (US); Vicki W. Tsai, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 10/814,096

(22) Filed: Mar. 30, 2004

(65) Prior Publication Data

US 2005/0220093 A1    Oct. 6, 2005

(51) Int. Cl.
*H04L 12/28* (2006.01)
*H04L 12/56* (2006.01)
*H04J 3/24* (2006.01)

(52) U.S. Cl. .................................. 370/389; 370/474
(58) Field of Classification Search ............. 370/389, 370/392, 352, 401, 465–466, 395.5, 464, 370/470, 471, 472, 473, 474
See application file for complete search history.

(56) References Cited

U.S. PATENT DOCUMENTS

| | | | | |
|---|---|---|---|---|
| 4,771,391 | A * | 9/1988 | Blasbalg | 709/232 |
| 5,802,051 | A * | 9/1998 | Petersen et al. | 370/395.42 |
| 5,822,321 | A * | 10/1998 | Petersen et al. | 370/474 |
| 7,027,434 | B2 * | 4/2006 | De Vleesschauwer et al. | 370/352 |
| 2003/0188249 | A1 * | 10/2003 | Park et al. | 714/755 |
| 2004/0156354 | A1 * | 8/2004 | Wang et al. | 370/352 |

FOREIGN PATENT DOCUMENTS

| EP | 1315335 A1 | 5/2003 |
|---|---|---|
| WO | WO-2005/099191 A1 | 10/2005 |

OTHER PUBLICATIONS

"International Search Report for corresponding PCT Application No. PCT/US2005/010379", (Sep. 1, 2005), 4 pgs.
Chandranmenon, G. P., et al., "Reconsidering Fragmentation and Reassembly", *Proceedings of the 17th Annual ACM Symposium on principles of Disrtibuted Computing*, 1998, (Jun. 28, 1998),21-29.

(Continued)

*Primary Examiner*—Hassan Kizou
*Assistant Examiner*—Betty Lee
(74) *Attorney, Agent, or Firm*—Schwegman, Lundberg & Woessner, P.A.

(57) ABSTRACT

In various embodiments, a processing element (PE) includes a data router adaptor (DRA) and one or more elements that produce function packets. When the DRA receives a function packet, it generates a set of associated router packets. Each of the associated router packets includes a segment of the function packet, and has a router packet data length that is less than or equal to the function packet length. In one embodiment, the router packet data lengths are included in a table, and can be re-configured to alter system performance parameters (e.g., bandwidth usage and/or latency). The DRA sends the set of associated router packets to a router for delivery through a packet-based network. A destination DRA receives the set of associated router packets, and generates a re-assembled function packet from the set of associated router packets. The destination DRA sends the re-assembled function packet to a destination element.

21 Claims, 8 Drawing Sheets

OTHER PUBLICATIONS

Gilfeather, P., et al., "Fragmentation and High Performance IP", *Proceedings of 15th International Parallel and Distributed Processing Symposium, IEEE Computer Society*,(Apr. 23, 2001), 1690-1697.

Postel, I. J., "The TCP Maximum Segment Size and Related Topics", *IETF Standard, Internet Engineering Task Force*, Network Working Group, (Nov. 1983), 12 pgs.

Stevens, W. R., et al., "TCP/IP Illustrated 11.5 IP Fragmentation", *TCP/IP Illustrated*, vol. 1, The Protocols, Professional Computing Series, (1994), 148-151.

* cited by examiner

METHODS AND APPARATUS FOR RECONFIGURING PACKETS TO HAVE VARYING SIZES AND LATENCIES

TECHNICAL FIELD

The inventive subject matter pertains to methods and apparatus for reconfiguring packets, and more particularly, to methods and apparatus for reconfiguring function packets to create router packets with varying sizes and packet latencies.

BACKGROUND

In a packet-based, distributed processing system, processing blocks may perform various functions in parallel and/or in series. To communicate information from a source processing block to a destination processing block, the source processing block generates one or more packets, each of which includes a packet header and a data portion. The source processing block sends the packets to a router, which may then forward the packets to another router. Packet routing continues until the packets reach a destination router, which delivers the packets to the destination processing block.

In a typical distributed processing system, the router packet length is fixed (i.e., each router packet has the same length). This gives rise to a minimal latency, or delay, within the system. Packet transmission also can incur latency due to contention for limited resources (e.g., bandwidth and data buffer space). Because of the use of fixed-length packets, if a function executed by a source processing block produces an amount of information that exceeds the data capacity of a single packet, within a given time interval, multiple packets are generated and sent to communicate the information. Sending multiple packets implies more packet header overhead and greater use of the router bandwidth. If a function executed by a source processing block produces information at a relatively slow rate, then the processing block may be required to wait until it has enough information to form a packet. As a result, longer latency is introduced within the system.

BRIEF DESCRIPTION OF THE DRAWINGS

The appended claims point out different embodiments of the inventive subject matter with particularity. However, the detailed description presents a more complete understanding of the inventive subject matter when considered in connection with the figures, wherein like-reference numbers refer to similar items throughout the figures and:

DETAILED DESCRIPTION

In the following description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter. It is to be understood that other embodiments may be utilized, and that process or mechanical changes may be made, without departing from the scope of the inventive subject matter. Such embodiments of the inventive subject matter may be referred to, individually and/or collectively, herein by the term "invention" merely for convenience and without intending to limit voluntarily the scope of this application to any single invention or inventive concept if more than one is in fact disclosed. It will be recognized that the methods of various embodiments can be combined in practice, either concurrently or in succession. Various permutations and combinations will be readily apparent to those skilled in the art.

Embodiments of the invention can be implemented in several types of devices and packet-based, distributed processing systems. For example, but not by way of limitation, embodiments of the invention can be implemented in a wireless communication device, such as a wireless telephone or a wireless local area network (WLAN) device. Alternatively, embodiments of the invention can be implemented in wired communication devices and/or computing devices.

Embodiments of the invention can be implemented to communicate information between processing elements of a distributed system within a single device or among multiple devices. Examples of some of these embodiments will be described below. These examples are for illustration purposes and are not meant to limit application of the embodiments only to devices or components having the specific characteristics described in the examples. Instead, it would be obvious to one of skill in the art, based on the description herein, how to adapt the embodiments to apply to other types of devices and systems. For example, although described embodiments primarily involve distributed processing systems, embodiments of the invention also could be applied to packet-switched communications within a wired or wireless communication system.

Figure 1:
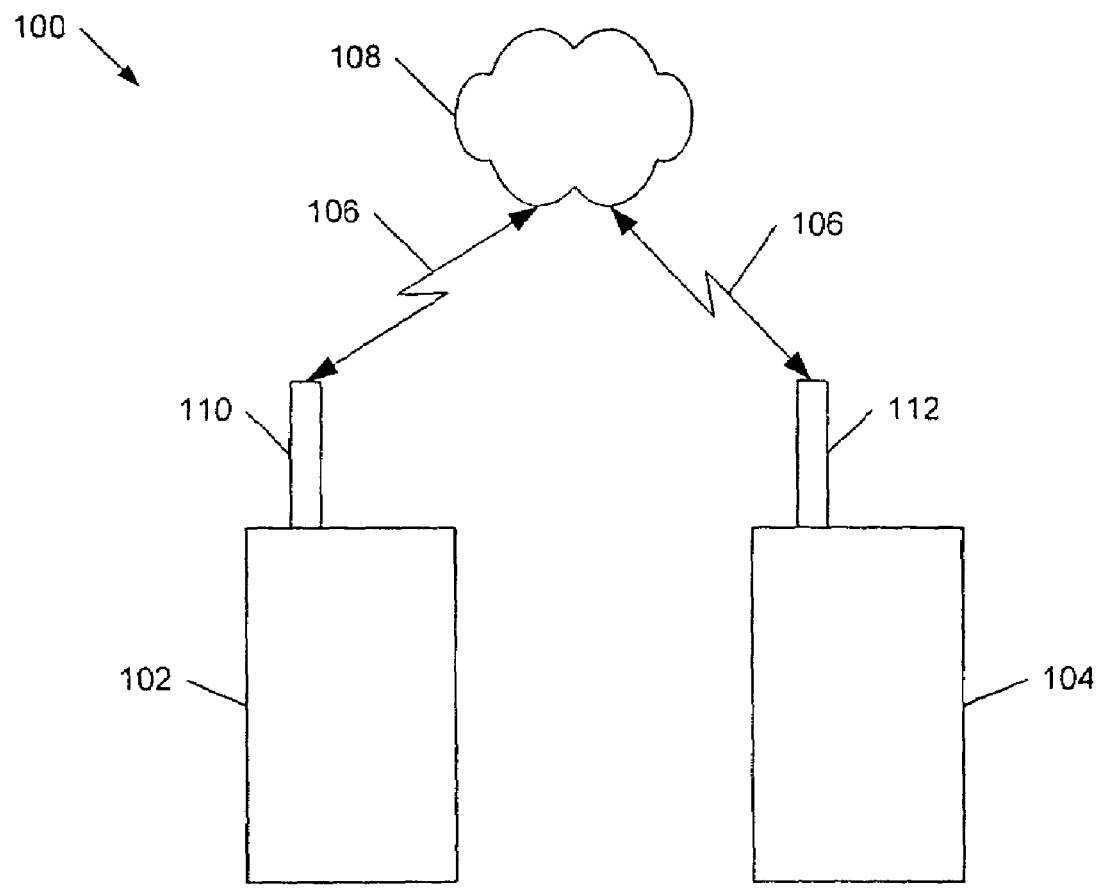
FIG. 1 is a simplified block diagram of a communication system, in accordance with an embodiment of the inventive subject matter.

FIG. 1 is a simplified block diagram of a communication system 100, in accordance with an embodiment of the inventive subject matter. Embodiments of the invention can be implemented in devices within a system, such as communication system 100. Those of skill in the art will understand, based on the description herein, that embodiments of the invention also could be implemented in a variety of other types of wired or wireless communication and/or computation systems. The system illustrated in FIG. 1 is given for the purpose of example and should not be construed as limiting the invention to implementation within any particular kind of system or system configuration.

Communication system 100 includes at least two wireless devices 102, 104, which communicate over wireless links 106 with a network 108. Links 106 can be half- or full-duplex links, in various embodiments. Network 108 includes one or more network routers, computing devices, access points, base stations, satellites, and/or a number of other types of intermediate stations that facilitate communication between devices 102, 104.

Devices 102, 104 can be, for example, but not by way of limitation, cellular telephones, radios, computers, personal data assistants, pagers, global positioning system (GPS) devices, and/or any of a number of other types of devices that are capable of communicating over a network 108. In one particular embodiment, devices 102, 104 are computing devices that are capable of implementing a WLAN communications protocol, such as one or more versions of Industry of Electrical and Electronics Engineers (IEEE) 802.11 Standard protocols or another WLAN protocol. Devices 102, 104 produce and consume information. This information may be transmitted and received over an air interface via antennas 110, 112 and network 108.

Figure 2:
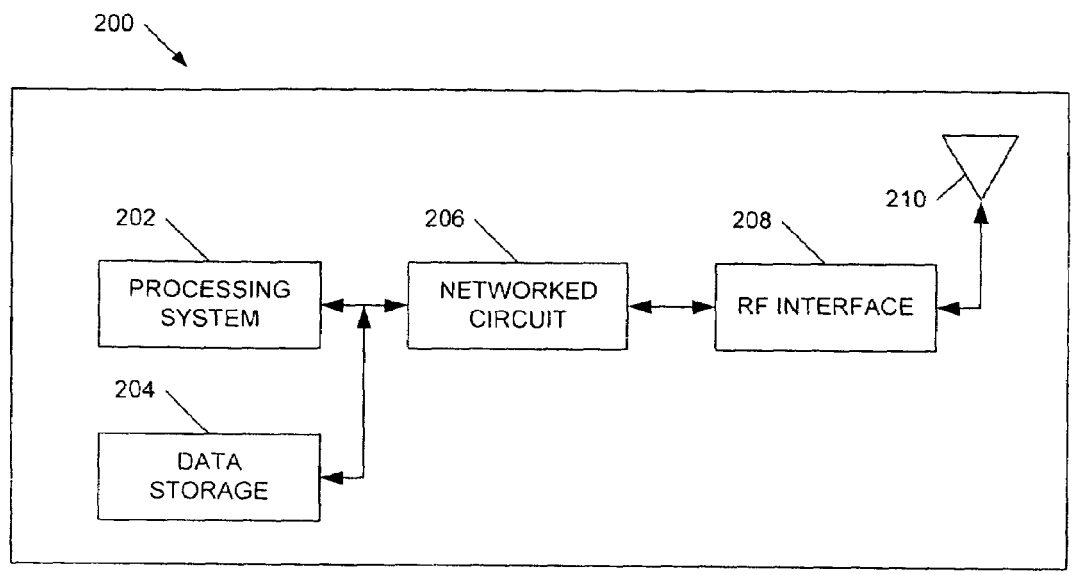
FIG. 2 is a simplified block diagram of a communication device, in accordance with an embodiment of the inventive subject matter.

FIG. 2 is a simplified block diagram of a communication device 200, in accordance with an embodiment of the inventive subject matter. In the device 200 shown in FIG. 2, embodiments of the invention may be implemented in conjunction with packet-switched communication that occurs within one or more elements within the device 200, in addition to possibly implementing embodiments of the invention in conjunction with packet-switched communication between the device 200 and a separate device (not shown).

Device 200 includes processing system 202, data storage 204, networked circuit 206, radio frequency (RF) interface 208, and antenna 210. Processing system 202 may include any of a number of types of computing modules, including but not limited to, microprocessors, microcontrollers, digital signal processors, application specific integrated circuits (ASICs), combinations thereof, or the like.

In one embodiment, processing system 202 receives or creates source information. The source information may be generated by the device 200, retrieved from data storage 204, or received from some other information producer (not illustrated). Source processing system 202 may pass the source information to networked circuit 206.

Data storage 204 represents articles that include a machine readable and/or writeable medium. For example, but not by way of limitation, data storage 204 may include any one or more of the following: hard disks, floppy disks, random access memories (RAMs), dynamic RAMs (DRAMs), static RAMs (SRAMs), read-only memories (ROMs), flash memories, compact disk ROMs (CDROMs), or any other types of articles that include a medium readable and writeable by a machine such as processing system 202.

Figure 3:
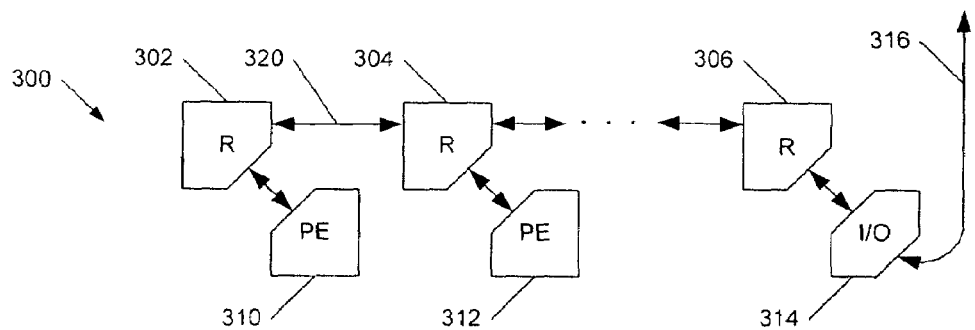
FIG. 3 is a simplified block diagram of a networked circuit, in accordance with an embodiment of the inventive subject matter.
Figure 4:
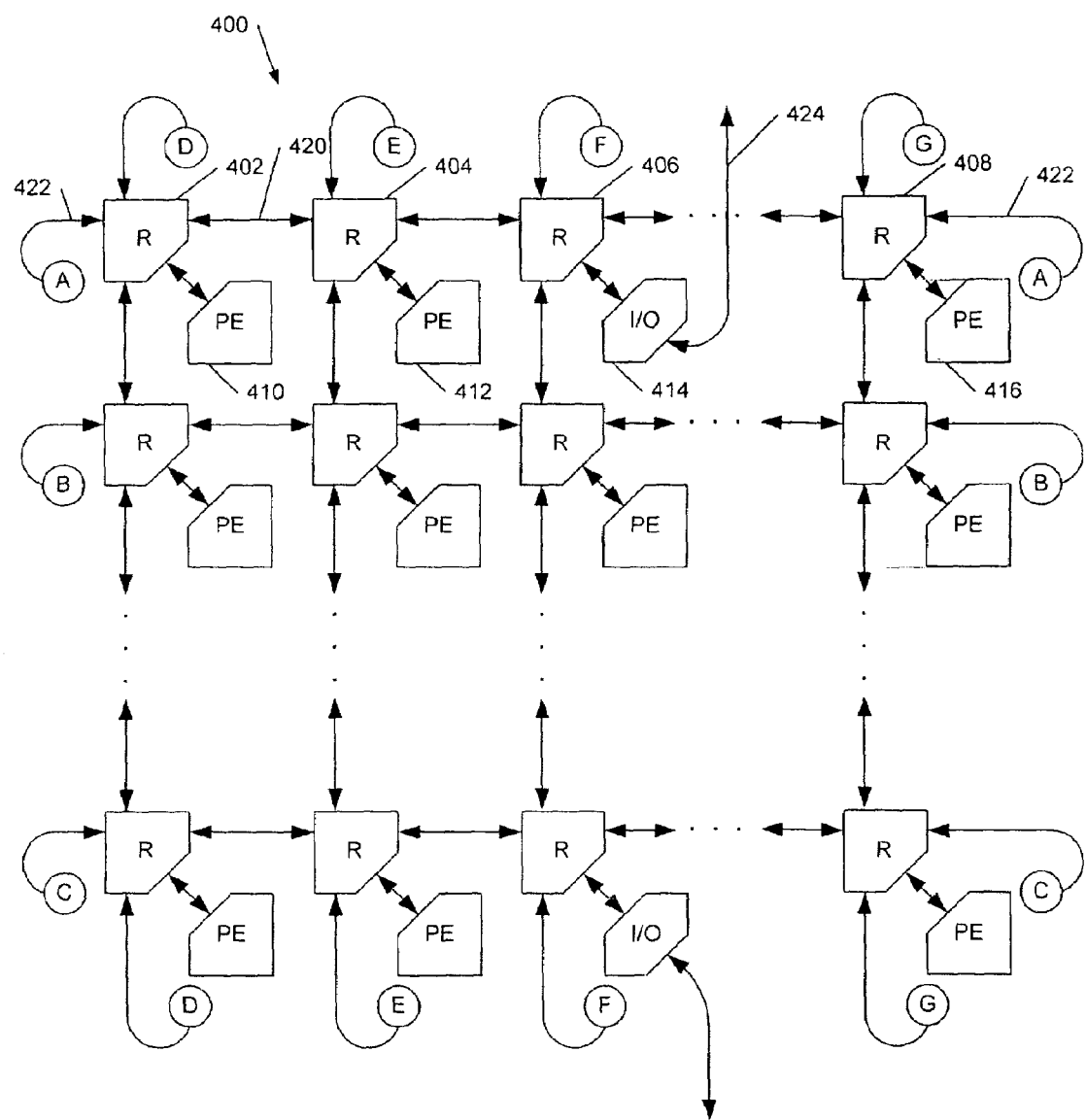
FIG. 4 is a simplified block diagram of a networked circuit, in accordance with another embodiment of the inventive subject matter.
Figure 5:
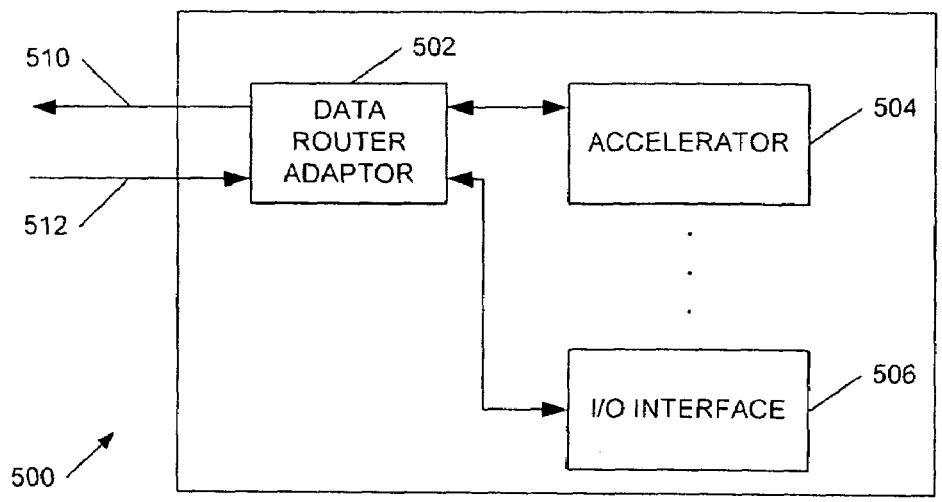
FIG. 5 is a simplified block diagram of a packet-switched processing element, in accordance with an embodiment of the inventive subject matter.

Networked circuit 206 may include one or more routers (described in more detail in conjunction with FIGS. 3-5), and one or more processing elements (PEs) and/or input/output (I/O) nodes (described in more detail in conjunction with FIGS. 3-5). In various embodiments, networked circuit 206 implements packet-based communications between the various PEs and/or I/O nodes.

The PEs and/or I/O nodes may receive, consume, and/or modify source information received from processing system 202. Each PE and/or I/O node may include one or more functions. These functions may perform any of a number of data-related tasks, including generating, manipulating, and/or moving data. In addition, these functions may produce packets, referred to herein as "function packets."

Additionally, in various embodiments, networked circuit 206 includes one or more routers (described in more detail in conjunction with FIGS. 3 and 4), which receive router packets from the one or more PEs and/or I/O nodes and route the router packets between themselves and then to the destination PEs or I/O nodes. Furthermore, in various embodiments, networked circuit 206 includes one or more data router adaptors (DRAs) (described in more detail in conjunction with FIGS. 5 and 6), which generate sets of associated router packets from one or more function packets supplied by one or more functions associated with the PEs or I/O nodes. In various embodiments, the router packet data length is less than or equal to the function packet length. In addition, in various embodiments, a DRA may be capable of receiving a set of associated router packets, generating a re-assembled function packet, and providing the re-assembled function packet to a destination function associated with a PE or an I/O node.

In various embodiments, the router packet length is configurable on a function-by-function basis. In other words, a DRA may produce router packets having a first length for a first function, and may produce router packets having a second, different length for a second function. Variable-sized packets enable packet latency (or delay) to be improved, particularly for functions that produce a result at a relatively slow rate. In such cases, the router packet length can be configured to be relatively short, enabling a router packet to be formed and sent without having to acquire enough data to fill a larger, fixed-length router packet. In addition, variable-sized packets enable router bandwidth to be more efficiently used, particularly for functions that produce a result at a relatively fast rate. In such cases, the router packet length can be relatively long, enabling more data to be sent in one packet, thereby reducing the packet overhead introduced by the router packet headers.

In one embodiment, networked circuit 206 implements at least a portion of a communication protocol, which may include performing functions such as data encoding/decoding, data modulation/demodulation, data encryption/decryption, and the like. For example, in some embodiments, networked circuit 206 may implement a protocol for a WLAN interface, cellular phone interface, GPS interface, or the like. In some embodiments, networked circuit 206 may implement multiple protocols simultaneously.

Networked circuit 206 may have many uses. For example, networked circuit 206 may be configured to instantiate particular physical layer (PHY) implementations in communications systems, or to instantiate particular media access control layer (MAC) implementations in communications systems. Alternatively or in addition, networked circuit 206 may perform other data processing functions as well, in various embodiments, including functions associated with image processing, video processing, sound/voice processing, data processing, and the like.

In some embodiments, multiple configurations for networked circuit 206 may exist, and processing system 202 or some other control element may change a configuration of networked circuit 206 by performing a reconfiguration or reprogramming process of networked circuit 206. Changing from one configuration to another may, for example, allow router packet lengths to be adjusted, as will be described in more detail later, and/or may allow a communications system to switch quickly from one PHY to another, one MAC to another, or between any combination of multiple configurations.

In some embodiments, networked circuit 206 is part of an integrated circuit. In some of these embodiments, networked circuit 206 is included on an integrated circuit die that includes circuitry other than networked circuit 206. For example, networked circuit 206 may be included on an integrated circuit die with a processor, memory, or any other suitable circuit. In some embodiments, networked circuit 206 coexists with RF circuits on the same integrated circuit die to increase the level of integration of a communications device. Furthermore, in some embodiments, networked circuit 206 spans multiple integrated circuit dies.

RF interface 208 prepares information received from networked circuit 206 for transmission over the air interface, and/or RF interface 208 prepares information received from antenna 210 for consideration by networked circuit 206 and/or processing system 202. RF interface 208 may include, for example but not by way of limitation, filters, analog-to-digital (AtoD) and/or digital-to-analog (DtoA) converters, buffers, and various other elements. In various embodiments, RF interface 208 may operate at appropriate frequencies for the protocol implemented by device 200. In some embodiments, RF interface 208 is omitted (e.g., for a device that does not communicate over a wireless interface).

Device 200 includes at least one antenna 210, in one embodiment. Antenna 210 may include a directional antenna and/or omni-directional antenna. For example, but not by way of limitation, in some embodiments, antenna 210 may include an omni-directional antenna, such as a dipole antenna or quarter-wave antenna. Also for example, in some embodiments, antenna 210 may include a directional antenna, such as a parabolic dish antenna or Yagi antenna. In some embodiments, antenna 210 is omitted. In some embodiments, RF signals transmitted or received by antenna 210 may correspond to voice signals, data signals, or any combination thereof. When an infrared specification is implemented, a light-emitting diode (LED) (not shown) or other optical transmission device may be used instead of the antenna 210.

Embodiments of the invention can be used in a system or network that includes distinct source devices, routers, and destination devices. Alternatively or in addition, embodiments of the invention can be used within a networked circuit of a single device, where the processing circuit includes various PEs and/or I/O nodes and routers. Although the remainder of the description discusses embodiments of the invention in terms of a networked circuit, it would be obvious to one of skill in the art, based on the description herein, how the disclosed embodiments could be modified to apply the inventive subject matter to a system or network with distinct source devices, routers, and destination devices. Therefore, the remainder of the detailed description is not meant to limit the scope of the inventive subject matter to networked circuits.

FIGS. 3 and 4 illustrate two examples of networked circuits within which embodiments of the invention can be implemented. The examples illustrated in FIGS. 3 and 4 are not meant to limit the scope of the inventive subject matter to these example networked circuits. Instead, as would be obvious to one of skill in the art, based on the description herein, embodiments of the invention could be used in any of a number of networked circuits having different configurations from those shown.

FIG. 3 is a simplified block diagram of a networked circuit 300, in accordance with an embodiment of the inventive subject matter. Networked circuit 300 includes a plurality of interconnected routers ("R") 302, 304, 306, and a plurality of PEs 310, 312 and/or I/O nodes 314. For ease of description, PEs 310, 312 and I/O nodes 314 are referred to generically as packet-based communication (PBC) elements, as they use a packet-based communications protocol to communicate with each other.

In some embodiments, each router 302, 304, 306 is coupled to a single PBC element 310, 312, 314. For example, as shown in FIG. 3, PBC element 310 is coupled to router 302, and PBC element 312 is coupled to router 304. In other embodiments, each router is coupled to more than one PBC element.

In one embodiment, the routers are connected together in series. For example, as shown in FIG. 3, routers 302 and 304 are coupled together directly by interconnect 320. Conversely, routers 302 and 306 are coupled together through router 304 and any other intermediate routers (not illustrated). Other direct interconnections (not illustrated) could exist between the various routers, in other embodiments.

In some embodiments of the present invention, networked circuit 300 may include various types of "data processing" PBC elements 310, 312 having a variety of different architectures for processing data. In addition, networked circuit 300 also may include various types of "I/O" PBC elements 314, which perform I/O functions, and accordingly may be used by networked circuit 300 to communicate with other circuits, as indicated by connection 316, which enables information to be input to and/or output from circuit 300. For example, I/O PBC element 314 may be used to communicate with a host processor or an analog front end such as an RF receiver or transmitter. Any number of data processing PBC elements 310, 312 and/or I/O PBC elements 314 may be included in networked circuit 300, and their architectures may vary widely. Furthermore, a particular PBC element may include both data processing and I/O interface capabilities.

In some embodiments, a PBC element may be capable of performing multiple functions. At least some of the functions produce function packets. Each of the multiple functions may utilize different types or sizes of function packets.

In various embodiments, at least some of the PBC elements convert the function packets, received from the functions, into "router packets," which the PBC elements send to the routers. In various embodiments, routers 302, 304, 306 communicate with each other and with PBC elements 310, 312, 314 using the router packets. For example, if PBC element 310 has information to be sent to PBC element 312, it may send one or more router packets to source router 302, which routes the packet to destination router 304 for delivery to PBC element 312. One or more intermediate routers may (or may not) exist between a source router and a destination router. Router packets may be of any size.

FIG. 3 illustrates a one-dimensional circuit, which includes a single row of router/PBC element pairs. Although three router/PBC element pairs are illustrated, more or fewer pairs could be included in other embodiments, as indicated by the ellipsis. In other embodiments, a networked circuit could include a multi-dimensional circuit (e.g., two-dimensional, three-dimensional, and up), which includes interconnected rows and columns of router/PBC element pairs. For example, but not by way of limitation, FIG. 4 illustrates a two-dimensional circuit.

FIG. 4 is a simplified block diagram of a networked circuit 400, in accordance with another embodiment of the inventive subject matter. Networked circuit 400 includes a plurality of interconnected routers 402, 404, 406, 408, and a plurality of PEs 410, 412, 416 and/or I/O nodes 414. For ease of description, PEs 410, 412, 416 and I/O nodes 414 are referred to generically as PBC elements, as they were in conjunction with FIG. 3.

In some embodiments, each router 402, 404, 406, 408 is coupled to a single PBC element 410, 412, 414, 416. For example, as shown in FIG. 4, PBC element 410 is coupled to router 402, and PBC element 412 is coupled to router 404. In other embodiments, each router is coupled to more than one PBC element.

In one embodiment, the routers are coupled together in a toroidal arrangement. For example, as shown in FIG. 4, routers 402 and 408 are coupled together through routers 404, 406, and any other intermediate routers (not illustrated). Routers 402 and 408 are also coupled together directly by interconnect 422 (shown at left of router 402 and at right of router 408).

The various routers (and PBC elements) in networked circuit 400 are arranged in rows and columns with nearest-neighbor interconnects, forming a toroidal interconnect. Other direct interconnections (not illustrated) could exist between the various routers, in other embodiments.

In some embodiments of the present invention, networked circuit 400 may include various types of data processing PBC elements 410, 412, 416 having a variety of different architectures for processing data. In addition, networked circuit 400 also may include various types of I/O PBC elements 414, which perform I/O functions, and accordingly may be used by networked circuit 400 to communicate with other circuits, as indicated by connection 424, which enables information to be input to or output from circuit 400. For example, I/O PBC element 414 may be used to communicate with a host processor or an analog front end such as an RF receiver or transmitter. Any number of data processing PBC elements 410, 412, 416 and/or I/O PBC elements 414 may be included in networked circuit 400, and their architectures may vary widely. Furthermore, a particular PBC element may include both data processing and I/O interface capabilities.

In some embodiments, a PBC element may be capable of performing multiple functions. At least some of the functions produce function packets. Each of the multiple functions may utilize different types or sizes of function packets.

In various embodiments, at least some of the PBC elements convert the functions packets, received from the functions, into router packets, which the PBC elements send to the routers. In various embodiments, routers 402, 404, 406, 408 communicate with each other and with PBC elements 410, 412, 414, 416 using the router packets. Router packets may be of any size.

FIG. 4 illustrates a two-dimensional circuit, which includes three rows and four columns of router/PBC element pairs. More or fewer rows and/or columns of router/PBC element pairs could be included in other embodiments, as indicated by the ellipses.

FIG. 5 is a simplified block diagram of a PBC element 500, in accordance with an embodiment of the inventive subject matter. PBC element 500 includes at least one data router adaptor (DRA) 502. In addition, PBC element 500 includes at least one accelerator 504 and/or at least one I/O interface 506. Although one accelerator 504 is shown, more accelerators could be included, or an accelerator could be excluded as long as PBC element 500 includes at least one I/O interface 506. Similarly, although one I/O interface 506 is shown, more I/O interfaces could be included, or an I/O interface could be excluded as long as PBC element 500 includes at least one accelerator 504.

In one embodiment, DRA 502 includes hardware, firmware, and/or software that enable DRA 502 to receive a function packet from a source function executed on accelerator 504 and/or I/O interface 506, to convert the function packets into a set of associated router packets, and to send the associated set to a router (not illustrated) over link 510. In addition, in one embodiment, DRA 502 includes hardware, firmware, and/or software that enable DRA 502 to receive, over link 512, an associated set of router packets from a router (not illustrated), to convert the associated set into a re-assembled function packet, and to send the re-assembled function packet to an accelerator 504 or I/O interface 506, which implements a function that uses the data within the re-assembled function packet (i.e., a destination function). A more detailed embodiment of DRA 502 is described later in conjunction with FIG. 6.

Accelerator 504 includes hardware, firmware, and/or software that enable accelerator 504 to perform data processing functions. Accelerator 504 can have any of a variety of different architectures. In addition, an accelerator 504 can perform a single function or can perform multiple functions sequentially or in parallel. For example, but not by way of limitation, one or more accelerators 504 may include a programmable logic array that may be configured to perform a particular logic function, while one or more other accelerators may include a processor core that may be programmed with machine instructions. As further examples, using one or more accelerators 504, a PBC element 500 may perform any one or more functions from a group of functions that include data filtering, data encoding and/or decoding, data modulation and/or demodulation, data encryption and/or decryption, and the like.

I/O interface 506 may be used to communicate with other circuits. For example, I/O interface 506 may be used to communicate with a host processor or an analog front end, such as an RF receiver or transmitter.

Accelerators 504 and/or I/O interfaces 506 may be configurable or programmable, and may have differing levels of configurability or programmability based on their underlying architectures. In alternate embodiments, some or all accelerators 504 and/or I/O interfaces 506 may not be configurable or programmable.

In some embodiments, a PBC element 500 may be capable of performing multiple data processing and/or I/O functions. In various embodiments, PBC element 500 may be capable of performing multiple functions sequentially or in parallel. Each of the multiple functions may communicate separately with other functions on the same PBC element 500, or on other PBC elements (not illustrated). At least some of the functions produce function packets and/or consume re-assembled function packets, in accordance with various embodiments. Each of the multiple functions may produce, transfer, or otherwise utilize different types or sizes of function packets.

Figure 6:
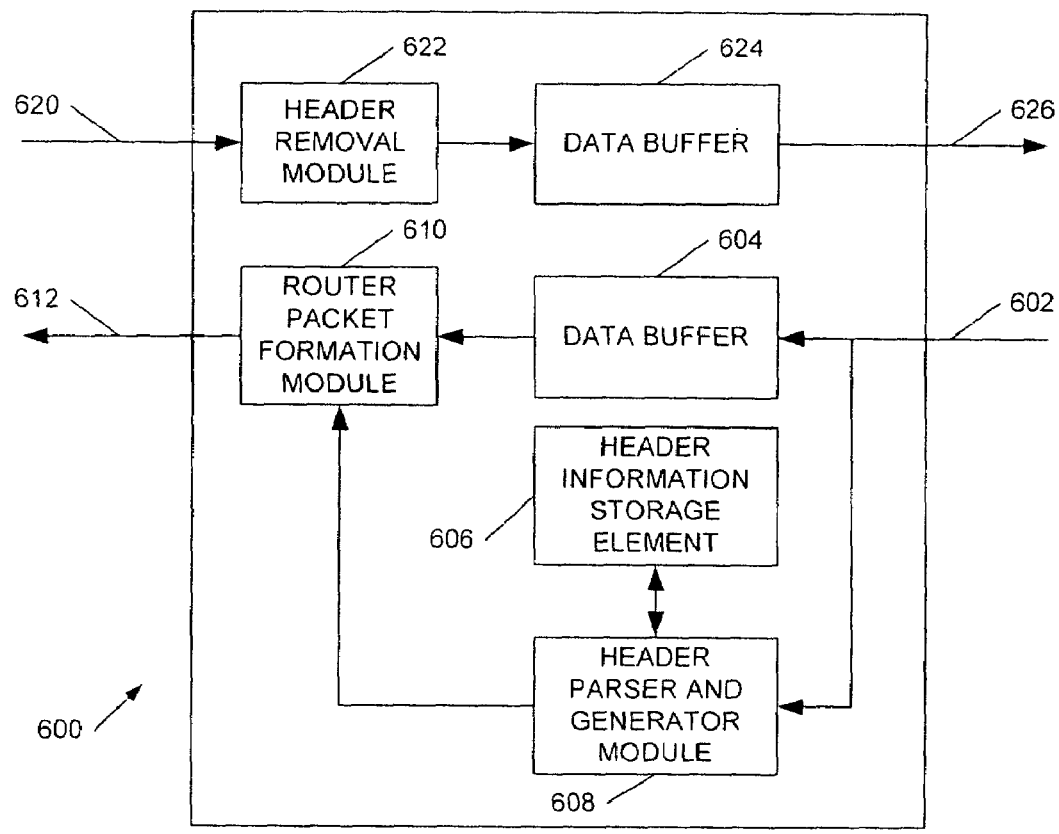
FIG. 6 is a simplified block diagram of a data router adaptor, in accordance with an embodiment of the inventive subject matter.

FIG. 6 is a simplified block diagram of a DRA 600, in accordance with an embodiment of the inventive subject matter. In one embodiment, DRA 600 includes a first data buffer 604, a header information storage element 606, a header parser and generator module 608, a router packet formation module 610, a header removal module 622, and a second data buffer 624.

DRA 600 receives a function packet via PBC element interface 602, which is capable of receiving packets from one or more PBC elements (e.g., accelerators 504 and/or I/O interfaces 506, FIG. 5). A received function packet's data are temporarily stored in data buffer 604, in one embodiment. Data buffer 604 can be, for example, a first-in, first-out (FIFO) buffer.

The function packet header is received and parsed by header parser and generator module 608. In one embodiment, header parser and generator module 608 stores the header and/or information included within the header in header information storage element 606. For example, header parser and generator module 608 may extract and store the function packet length, the router packet length, and/or other information from each function packet header. Header information storage element 606 may be, for example, a set of registers and/or another type of volatile or non-volatile data storage medium.

In one embodiment, both the function packet length and the router packet length are included in each function packet header. A function that produces a function packet obtains the router packet length from a table of pre-stored router packet lengths, in one embodiment. This "router packet length table" is initially configured to assign router packet lengths to each function. For example, the pre-stored router packet length information may indicate the same or different router packet lengths for any or all of the various functions and/or I/O interfaces from which DRA 600 may receive function packets.

In another embodiment, the router packet length may not be included in a function packet header. Instead, with knowledge of what function sent the function packet, the header parser and generator module 608 may access a router packet length table to determine the router packet length. In this embodiment, the router packet length table may be stored in header information storage element 606, in a computing module or elsewhere.

The router packet lengths associated with the various functions are configurable, in one embodiment, by enabling the values within the router packet length table to be updated. This enables the latency and/or router packet bandwidth usage to be adjusted, from time to time, by updating the router packet lengths for selected ones of the supported functions and/or I/O interfaces.

In one embodiment, the router packet length table is initially configured to default values that conform to acceptable end-to-end latency requirements. In another embodiment, a feedback process monitors system performance parameters (e.g., latency and/or bandwidth usage), and the router packet lengths are dynamically adjusted to improve the performance parameters based on the feedback information.

Header parser and generation module 608 produces a router packet header based on the header information. In one embodiment, the router packet header includes fields for a router packet length, among other things. The router packet is provided to router packet formation module 610.

Router packet formation module 610 receives the router-packet header, and forms a first router packet. In one embodiment, this involves concatenating the router packet header with a fragment of the function packet that is stored in data buffer 604. The first fragment includes all or a segment of the function packet header. The router packet formation module 610 sends the router packet out over router interface 612 to the router. This router packet is a first packet within a set of associated router packets.

The router packet formation module 610 determines whether the entire function packet has been re-packetized into one or more router packets. If not, then the router packet formation module 610 repeats the process of concatenating a router packet header with a next fragment of the function packet, as extracted from data buffer 604, and sending out a next router packet of the set of associated router packets. When the last fragment is packetized into a router packet, then the process is completed. In one embodiment, if the last fragment is less than the router packet data field size, then the last packet may be smaller than the preceding packets. In other embodiments, the remainder of the field is padded with zeros, a determinable pattern, or random data. In such an embodiment, additional information may be included in the packet header to enable a receiver to determine how much padding may exist within a packet.

The foregoing discussion gives one embodiment of how a function packet is fragmented into a set of associated router packets. Below, a discussion is given of how a set of associated router packets are re-assembled to produce a re-assembled function packet.

In one embodiment, an incoming router packet is received over a router interface 620 by header removal module 622. Header removal module 622 strips off the router packet header, and stores the data portion of the packet into data buffer 624. In one embodiment, data buffer 624 is a FIFO buffer. In another embodiment, the router packet header is not stripped off by header removal module 622, but instead is stored along with the function packet information in the data buffer 624 for subsequent removal by a different processing module or PBC element.

If the received router packet is a first packet of a set of associated router packets, then the data portion of the router packet includes a function packet header, in one embodiment. As a remainder of router packets within the set of associated router packets is received, a remainder of the data within the original function packet is re-assembled within the data buffer 624. The data within the data buffer 624 is sent out over PBC element interface 626 to the destination PBC element. Accordingly, the set of associated router packets is processed to create a re-assembled function packet.

Figure 7:
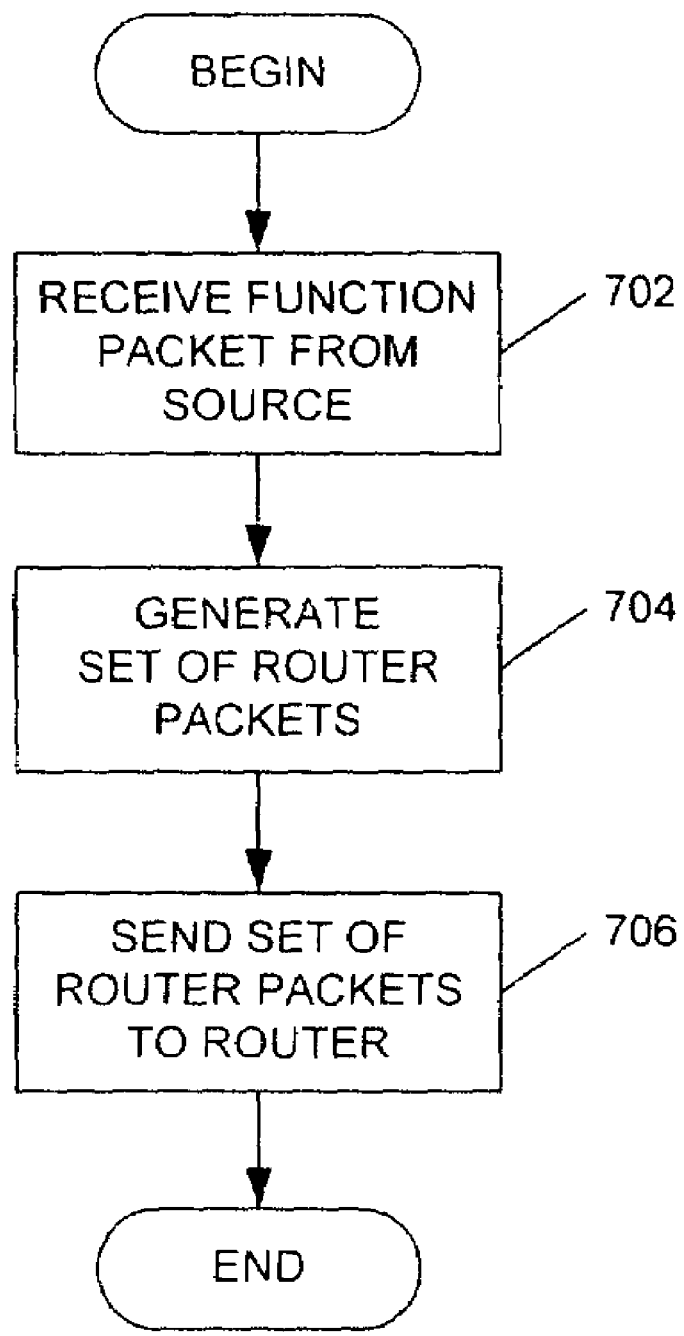
FIG. 7 is a flowchart of a procedure for generating a set of associated router packets, in accordance with an embodiment of the inventive subject matter.

FIG. 7 is a flowchart of a procedure for generating a set of associated router packets, in accordance with an embodiment of the inventive subject matter. In one embodiment, the method is performed substantially by a DRA (e.g., DRA 600, FIG. 6).

The method begins, in block 702, by receiving a function packet from a source, such as an accelerator or I/O interface, for example. An example of a function packet is illustrated in FIG. 8, which further illustrates conversion of a function packet 800 into a set of associated router packets 802, 804, 806, in accordance with an embodiment of the inventive subject matter.

Function packet 800 includes a header field 810 and a function data field 812. In one embodiment, information within header field 800 indicates the function packet length and/or the router packet data length. The indication of the function packet length can be, for example, a value that indicates the total function packet length or a value that indicates the function data field length. Similarly, the indication of the router packet data length can be, for example, a value that indicates the total router packet length or a value that indicates the router data field length. As would be obvious to one of skill in the art based on the description herein, other values alternatively could be used to indicate the function packet length and/or the router packet data length, in various embodiments. In still other embodiments, either or both the function packet length and/or the router packet data length are not indicated in the function packet header.

Figure 8:
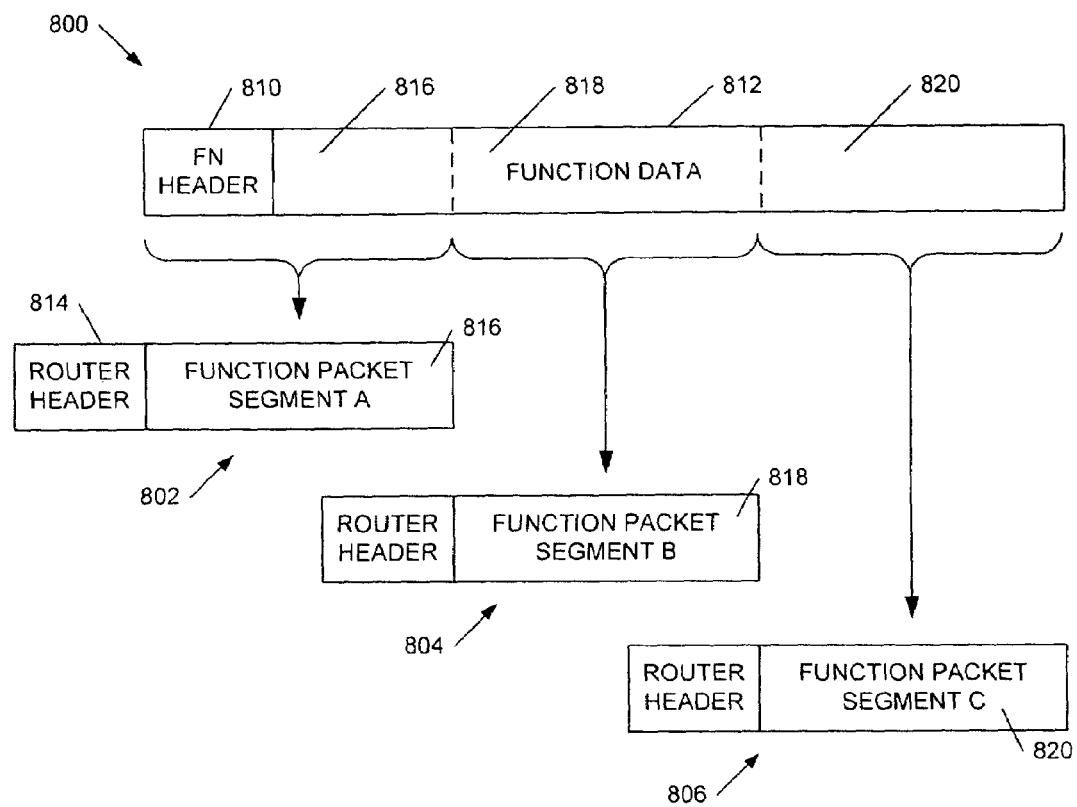
FIG. 8 is an example illustrating conversion of a function packet into a set of associated router packets, in accordance with an embodiment of the inventive subject matter.

Referring again to FIG. 7, in block 704, a set of associated router packets is generated. In one embodiment, each router packet may have a router packet data length that is less than or equal to a function packet length. The set of associated router packets are generated as follows, in one embodiment:

a) the function packet length and the router packet data length are determined from the function packet header (e.g., header 810, FIG. 8). In an alternate embodiment, the router packet data length is determined based on pre-stored configuration information and the identity or type of the source function or I/O interface that produced the function packet;

b) in one embodiment, a register is initialized to the function packet length;

c) after an amount of the function packet has been received, having a length that is equal to or greater than the router packet data length, a segment (e.g., segment 816, FIG. 8) of the function packet is selected. The segment has a segment length that is less than or equal to the router packet data length, in one embodiment;

d) a router packet (e.g., packet 802) is generated, which includes a header (e.g., header 814) and the segment (e.g., segment 816);

e) a determination is made, in one embodiment, whether any more function packet information remains to be packetized. In one embodiment, this is accomplished by using arithmetic logic to subtract the router packet data field length from the current value within the previously-initialized register (see step b, above). After subtracting the router packet data field length, arithmetic logic may then update the register to hold the decremented value. Comparator logic may evaluate the decremented value to determine whether any segments of function packet information remain to be selected for re-packetization. In one embodiment, if the decremented value is greater than zero, then at least one segment remains to be selected;

f) any next segments (e.g., data segments 818, 820, FIG. 8) that remain in the function packet are repeatedly extracted, and other router packets (e.g., packets 804, 806) are repeatedly generated until substantially all of the function packet has been included in the set of associated router packets (e.g., packets 802, 804, 806).

Referring again briefly to FIG. 7, the set of associated router packets is sent to a source router, in block 706, for delivery to a destination router. One or more intermediate routers may exist between the source router and the destination router. In one embodiment, each router packet may be sent as it is being generated, as soon as its generation is completed, or after generation of the entire set of associated packets to be completed. After sending the set of associated router packets, the method ends.

FIGS. 7 and 8 illustrated the functioning of a DRA (e.g., DRA 600, FIG. 6) when it receives a function packet from a PBC element (e.g., an accelerator or I/O interface), and fragments the function packet into a set of multiple, associated router packets that are subsequently sent to a router. In various embodiments, DRA is also capable of receiving a set of associated router packets, and processing the set of packets to generate a re-assembled function packet. This process is further described in reference to FIGS. 9 and 10.

Figure 9:
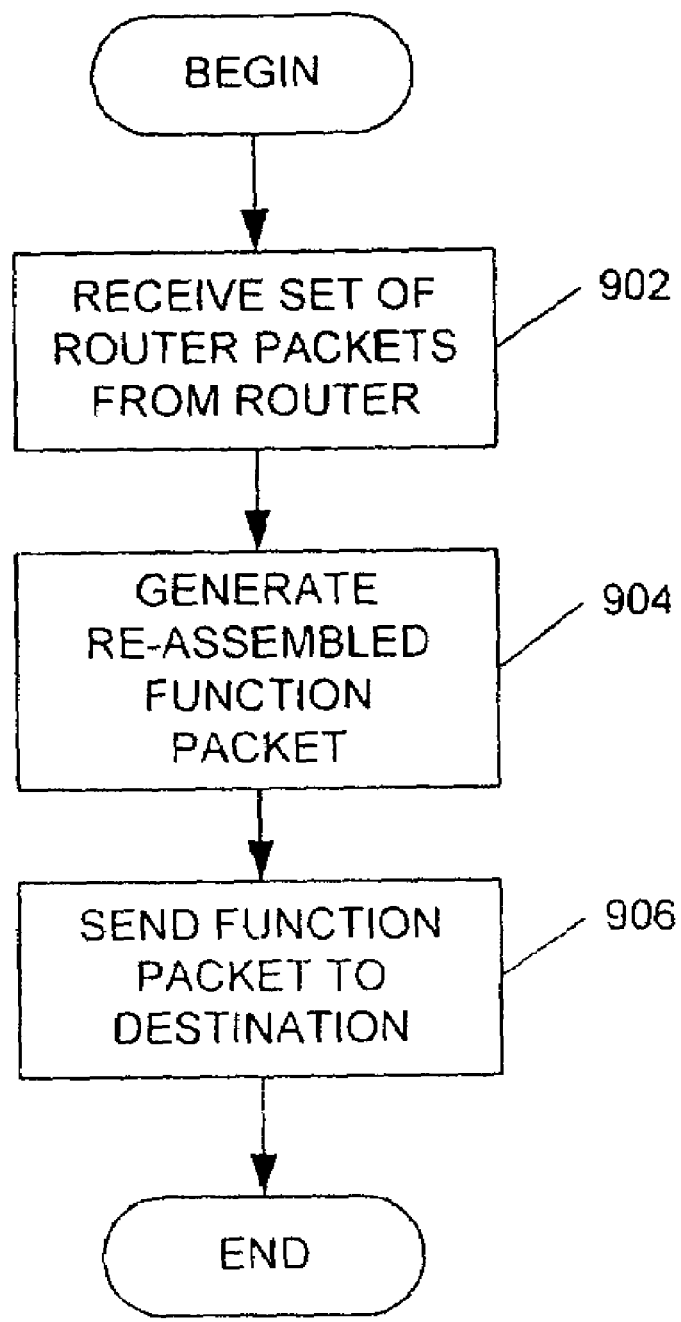
FIG. 9 is a flowchart of a procedure for generating a re-assembled function packet, in accordance with an embodiment of the inventive subject matter.

FIG. 9 is a flowchart of a procedure for generating a re-assembled function packet, in accordance with an embodiment of the inventive subject matter. In one embodiment, the method is performed substantially by a DRA (e.g., DRA 600, FIG. 6).

The method begins, in block 902, by receiving a set of associated router packets from a destination router. An example of a set of router packets is illustrated in FIG. 10, which further illustrates conversion of a set of router packets 1002, 1004, 1006 into a re-assembled function packet 1000, in accordance with an embodiment of the inventive subject matter.

Each router packet 1002, 1004, 1006 includes a router packet header field (e.g., field 1014) and a function packet segment field (e.g., field 1018). In one embodiment, information within header field 1014 indicates the function packet length and/or the router packet data length. In another embodiment, the function packet length is not indicated in the router packet header.

Figure 10:
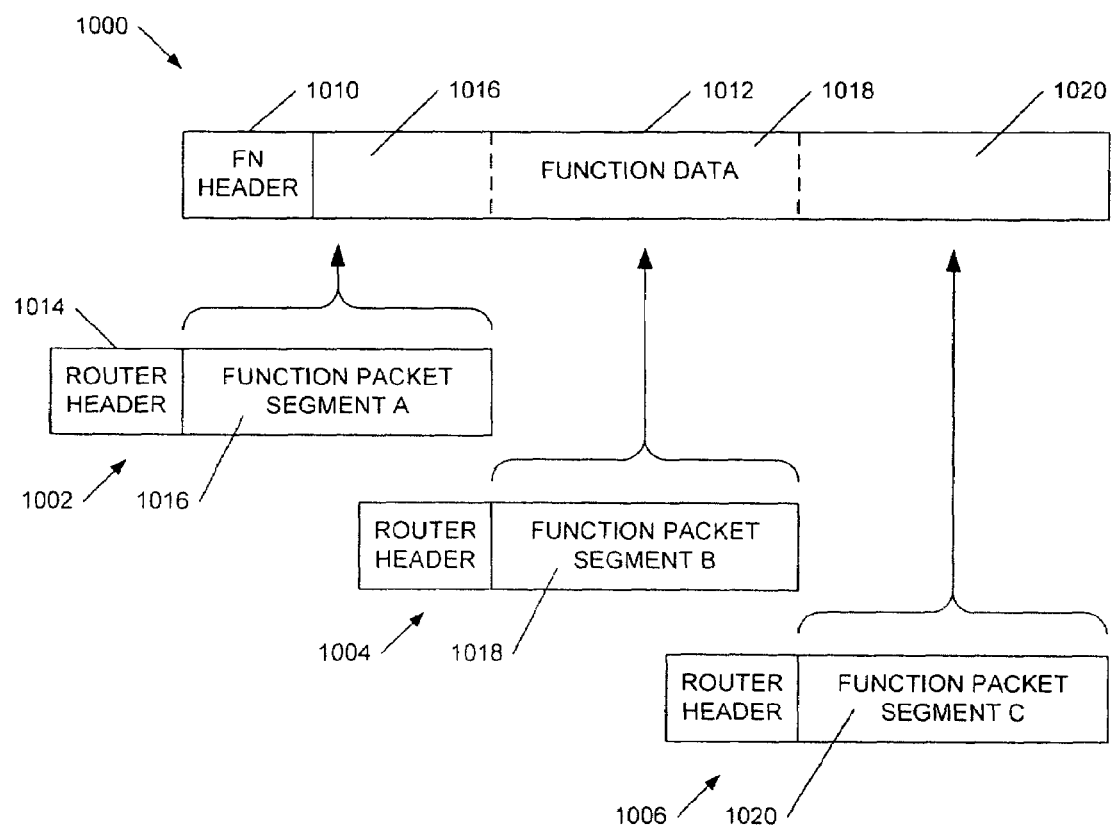
FIG. 10 is an example illustrating conversion of a set of associated router packets into a re-assembled function packet, in accordance with an embodiment of the inventive subject matter.

Referring again to FIG. 9, in block 904, a re-assembled function packet is generated. In one embodiment, the re-assembled function packet length is equal to the router packet data length. The re-assembled function packet is generated as follows, in one embodiment:

a) the function packet length and the router packet data length are determined from a router packet header (e.g., header 1014, FIG. 10);

b) in one embodiment, a register is initialized to the function packet length;

c) a function packet segment (e.g., segment 1016, FIG. 10) is extracted from a router packet (e.g., packet 1002) of the set of associated packets;

d) a re-assembled packet (e.g., packet 1000) is at least partially generated, which includes the extracted segment (e.g., segment 1016), positioned within the function packet at the appropriate location;

e) a determination is made, in one embodiment, whether any more function packet segments remain to be extracted from any other received router packets. In one embodiment, this is accomplished by using arithmetic logic to subtract the router packet data field length from the current value within the previously-initialized register (see step b, above). After subtracting the router packet data field length, arithmetic logic may then update the register to hold the decremented value. Comparator logic may evaluate the decremented value to determine whether any function packet segments remain to be extracted from the received router packets. In one embodiment, if the decremented value is greater than zero, then at least one segment remains to be extracted;

f) any next segments (e.g., segments 1018, 1020, FIG. 10) that have not been re-assembled into the function packet are repeatedly extracted until substantially all of the function packet information has been included in the function packet (e.g., packet 1000).

Referring again briefly to FIG. 9, the function packet is sent to its destination (e.g., an accelerator or I/O interface), in block 906. In one embodiment, no part of the function packet is sent until the entire packet has been re-assembled. In another embodiment, the function packet may begin to be sent as soon as the header (e.g., header 1010, FIG. 10) has been completed. After sending the function packet, the method ends.

The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

The operations described above, with respect to the methods illustrated and described herein, can be performed in a different order from that disclosed. Also, it will be understood that, although some methods are described as having an "end," they may be continuously performed.

The various procedures described herein can be implemented in hardware, firmware or software. A software implementation can use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, RAMs, ROMs, and the like. Accordingly, a computer-readable medium, including those listed above, may store program instructions thereon to perform a method, which when executed within an electronic device, result in embodiments of the inventive subject matter to be carried out.

What is claimed is:

1. A method comprising:
    receiving a first function packet, including a first function packet header and a first function packet segment, from a first function packet source, wherein the first function packet header indicates a first function packet length and a first router packet data length, wherein the first router packet data length is determined from pre-stored first router packet length information relating to a first function;
    determining whether the first function packet segment has a length at least equal to the first router packet data length;
    if so, generating a first router packet that includes the first function packet segment, wherein the first router packet has a first router packet data length that is less than or equal to the first function packet length;
    sending the first router packet to a first router;
    receiving a second function packet, including a second function packet header and a second function packet segment, from a second function packet source, wherein the second function packet header indicates a second function packet length, different from the first function packet length, and a second router packet data length, wherein the second router packet data length is determined from pre-stored second router packet length information relating to a second function;
    determining whether the second function packet segment has a length at least equal to the second router packet data length;
    if so, generating a second router packet that includes the second function packet segment, wherein the second router packet has a second router packet data length that is less than or equal to the second function packet length; and
    sending the second router packet to a second router.

2. The method of claim 1, wherein the router packet length information is stored in a router packet length table.

3. The method of claim 2, further comprising:
    manually re-configuring the pre-stored router packet length information.

4. The method of claim 1, wherein the pre-stored first router packet length information is stored in a router packet length table, the method further comprising:
    dynamically adjusting the pre-stored first router packet length information based on system performance measurements;
    monitoring network performance including latency of transmission of the first router packet to the first router; and
    updating values within the router packet length table in accordance with the network performance.

5. The method of claim 1, further comprising:
    selecting a next first function packet segment, wherein the next first function packet segment has a segment length that is related to the first router packet data length;
    generating another first router packet, which includes the next first function packet segment; and
    repeatedly selecting a next first segment and generating another first router packet until all of the first function packet has been included in a set of associated first router packets.

6. The method of claim 5, wherein generating the set of associated first router packets comprises:
    generating a first router packet header, which indicates the first router packet data length.

7. The method of claim 5, further comprising:
    sending the set of associated first router packets to the first router.

8. The method of claim 1, wherein the first function packet segment includes first function data.

9. The method of claim 1, wherein the first and second function packet segments include first and second function data, respectively.

10. The method of claim 1, wherein the first and second routers are one and the same.

11. The method of claim 1, wherein the first router packet data length is relatively short, corresponding to a relatively slow rate function.

12. The method of claim 1, wherein the second router packet data length is relatively long, corresponding to a relatively fast rate function.

13. A method comprising:
    a source adaptor generating a set of associated router packets from a function packet received from a function packet source, wherein the function packet has a variable length, wherein the function packet comprises function packet data, and wherein generating the set of associated router packets comprises:
    determining the function packet length and a router packet data length, wherein the router packet length is determined from a router packet length table;
    selecting a next segment of the function packet, wherein the next segment has a segment length that is less than or equal to the router packet data length;
    generating a router packet, which includes the next segment; and
    repeatedly selecting the next segment and generating the router packet until all of the function packet data has been included in the set of associated router packets;
    wherein each router packet has a router packet data length that is less than or equal to the function packet length;
    the source adaptor sending the set of associated router packets to a source router;
    the source router sending the set of associated router packets toward a destination router;
    the destination adaptor receiving the set of associated router packets from the destination router;
    the destination adaptor generating a re-assembled function packet from the set of associated router packets; and
    the destination adaptor sending the re-assembled function packet to a function packet destination.

14. The method of claim 13, wherein generating the re-assembled function packet comprises:
    removing a router packet header of each packet of the set of associated router packets.

15. An apparatus comprising:
    at least one router, which is operable to communicate with other routers using packet-based communications; and
    multiple processing elements, wherein selected ones of the multiple processing elements include
        at least one adaptor, operably connected to a router, which is operable to generate a set of associated router packets from a function packet received from a function packet source, wherein the function packet has a variable length, wherein the function packet comprises function packet data, and wherein each router packet has a router packet data length that is less than or equal to a function packet length, and to send the set of associated router packets to a router, and at least one function packet source, operably connected to the adaptor;

wherein generating the set of associated router packets comprises:

determining the function packet length and the router packet data length, wherein the router packet length is determined from a router packet length table;

selecting a next segment of the function packet, wherein the next segment has a segment length that is less than or equal to the router packet data length;

generating a router packet, which includes the next segment; and repeatedly selecting the next segment and generating the router packet until all of the function packet data has been included in the set of associated router packets.

16. The apparatus of claim 15, wherein an adaptor comprises:

a first data buffer, which is operable to receive the function packet from the function packet source;

a router packet formation module, which is operable to generate the set of associated router packets from the function packet; and a router interface, which is operable to send the set of associated router packets to the router.

17. The apparatus of claim 16, wherein the adaptor further comprises:

a second data buffer, which is operable to receive a different set of associated router packets and re-assemble a second function packet; and a packet-based communications element interface, which is operable to send a re-assembled function packet to a function packet destination.

18. The apparatus of claim 15, further comprising at least one antenna, which is operable to provide an interface between an air interface and the apparatus.

19. A computer-readable medium having program instructions stored thereon to perform a method, which when executed within an electronic device, result in:

receiving a first function packet, including a first function packet header and a first function packet segment, from a first function packet source, wherein the first function packet header indicates a first function packet length and a first router packet data length, wherein the first router packet data length is determined from pre-stored first router packet length information relating to a first function;

determining whether the first function packet segment has a length at least equal to the first router packet data length;

if so, generating a first router packet that includes the first function packet segment, wherein the first router packet has a first router packet data length that is less than or equal to the first function packet length;

sending the first router packet to a first router;

receiving a second function packet, including a second function packet header and a second function packet segment, from a second function packet source, wherein the second function packet header indicates a second function packet length, different from the first function packet length, and a second router packet data length, wherein the second router packet data length is determined from pre-stored second router packet length information relating to a second function;

determining whether the second function packet segment has a length at least equal to the second router packet data length;

if so, generating a second router packet that includes the second function packet segment, wherein the second router packet has a second router packet data length that is less than or equal to the second function packet length; and sending the second router packet to a second router.

20. The computer-readable medium of claim 19, wherein execution of the method further results in:

determining the first function packet length and the first router packet data length from a first function packet header;

selecting a next first function packet segment, wherein the next first function packet segment has a segment length that is related to the first router packet data length;

generating another first router packet, which includes the next first function packet segment; and repeatedly selecting a next first segment and generating another first router packet until all of the first function packet has been included in a set of associated first router packets.

21. The computer-readable medium of claim 20, wherein execution of the method further results in:

receiving a second set of associated router packets from a router;

re-assembling a third function packet from the second set of associated router packets; and sending the third function packet to a function packet destination.

* * * * *